United States Patent [19]

Nielsen

[11] 4,146,240
[45] Mar. 27, 1979

[54] COMBINATION OF A TOOL HOLDER AND A TOOL SHAFT

[76] Inventor: Mogens B. Nielsen, Dalvangsvej 2, DK-2600 Glostrup, Denmark

[21] Appl. No.: 785,165

[22] Filed: Apr. 6, 1977

[30] Foreign Application Priority Data

Apr. 7, 1976 [DK] Denmark .............................. 1651/76

[51] Int. Cl.² ............................................. B23B 31/04
[52] U.S. Cl. ................... 279/19.5; 279/1 Q; 279/76; 279/97; 408/226; 408/239 R
[58] Field of Search ....................... 279/19, 76, 79, 97, 279/24, 1 F, 1 Q, 1 T, 1 B, 19.5; 408/239, 226; 90/11 A

[56] References Cited

U.S. PATENT DOCUMENTS

| | | | |
|---|---|---|---|
| 3,458,210 | 7/1969 | Whitehouse | 279/19.5 |
| 3,830,135 | 8/1974 | Sullivan | 279/53 |

Primary Examiner—Gil Weidenfeld
Attorney, Agent, or Firm—Fleit & Jacobson

[57] ABSTRACT

The disclosure relates to a combination of a tool holder having a socket member with a cylindrical axial bore, and a tool shaft releasably received therein. A driving element is displaceably mounted in the socket member so as to be movable between an extended position in which part of the driving member extends into the axial bore, and a retracted position in which the driving member is retracted from the bore, and the driving element is biased towards its extended position by spring means. The tool shaft received in the tool holder has a transversely extending recess receiving the driving element in its extended position, whereby the tool shaft is locked in the tool holder. Adjacent to the free end of the tool shaft the said recess defines an abutment surface cooperating with an inner surface part of the driving element in its extended position so as to prevent axial withdrawal of the tool shaft from the axial bore of the socket member.

11 Claims, 10 Drawing Figures

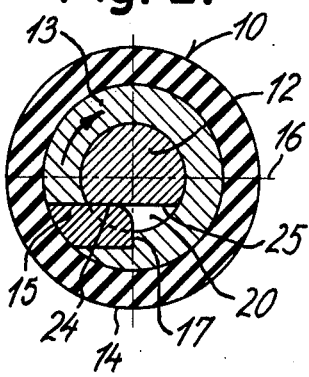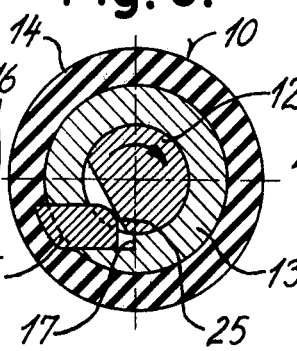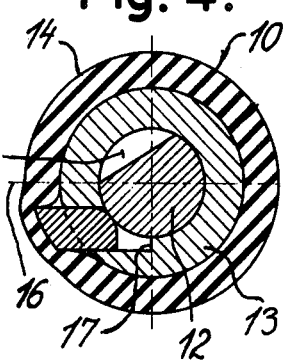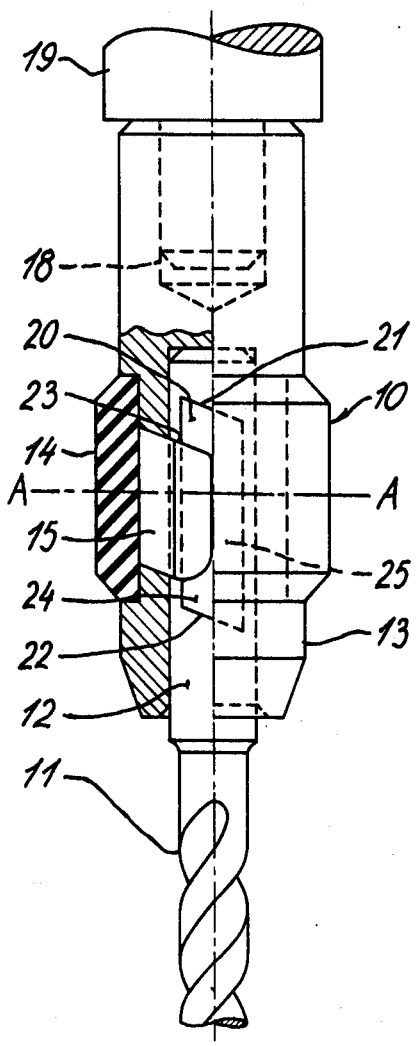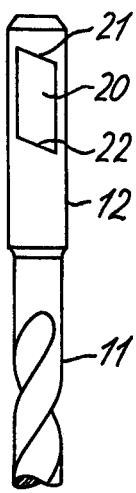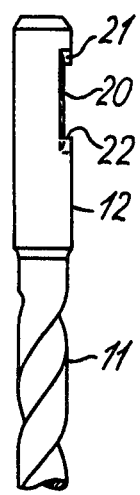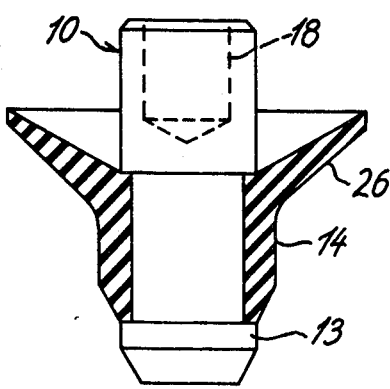

Fig. 7.
Fig. 8.
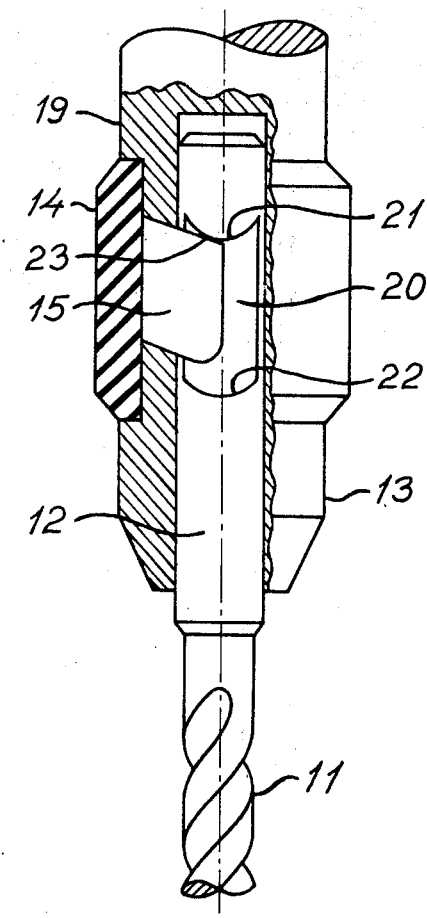
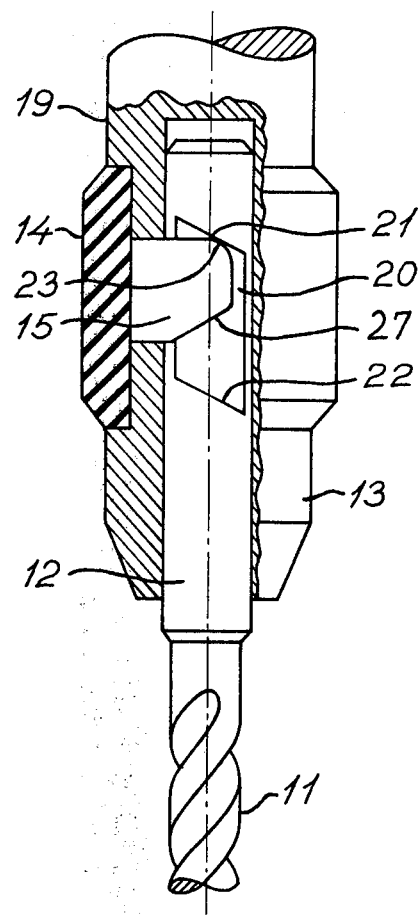
Fig. 9.
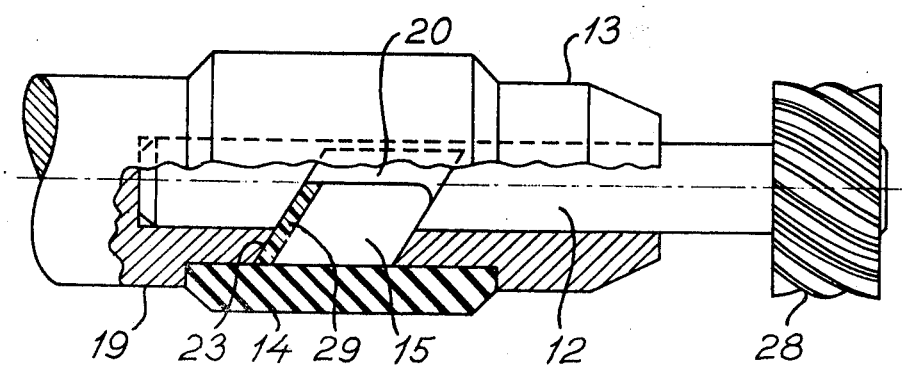

COMBINATION OF A TOOL HOLDER AND A TOOL SHAFT

BACKGROUND OF THE INVENTION

1. Field of the Invention

The present invention relates to a combination of a tool holder defining a substantially cylindrical bore, and a tool shaft releasably received in said bore.

The invention also relates to a tool holder and a tool shaft for use in such combination.

2. Description of Prior Art

U.S. Pat. No. 1,844,446 and German Utility Model Specification No. 7,439,278 disclose a tool holder having a socket member with a cylindrical, axial bore adapted to receive a tool shaft therein. A driving element is mounted displaceably in the socket member so as to be movable between an extended position in which part of the driving member extends into the cylindrical bore, and a retracted position in which the driving member is retracted from the cylindrical bore, and the driving element is biased towards its extended position by spring means. When the tool shaft is inserted into the cylindrical bore of the socket member the driving element is pushed to its retracted position, and when the tool shaft has been fully inserted into the cylindrical bore the spring biased driving element may move to its extended position in which it is partly received in a recess formed in one side of the tool shaft, whereby the driving element prevents the tool shaft from being moved axially out from the cylindrical bore of the socket member and renders it possible to transmit rotational forces from the tool holder to the tool shaft received therein. The said known tool holders and the corresponding tool shafts are adapted so that rotational movement of the tool shaft in the direction opposite to the normal rotational direction of the associated tool causes the driving element of the tool holder to be moved out of engagement with the recess in the tool shaft due to camming action, whereby the tool shaft is released and may be removed from the tool holder.

When in use a tool mounted in a tool holder of the above described known type may be subjected to an axial force directed away from the holder, and it may happen that at the same moment the tool and consequently also the tool shaft are subjected to a torque which is very small or may even be directed opposite to the normal rotational direction of the tool. Under such circumstances it may happen that the tool shaft is inadvertently released from the tool holder. Even though the risk of such inadvertent release is present in connection with almost any type of rotational tools it is especially pronounced in connection with rotating tools of the percussive type, such as hammer drills.

SUMMARY OF THE INVENTION

The present invention provides a combination of a tool holder defining a substantially cylindrical bore, and a tool shaft having a free end portion releasably received in said bore, said tool shaft defining therein at least one recess spaced from the free end of the shaft and being formed with an abutment surface at the end of the recess adjacent to the free end of the shaft, said tool holder comprising at least one displaceably mounted driving element extending into driving engagement with said recess and having a surface part for cooperating with said abutment surface for preventing said tool shaft from being moved axially out from the bore of said tool holder, said abutment surface of the recess and said surface part of the driving element being shaped so as to tend to rotate the tool shaft in the normal rotational direction of an associated tool when said abutment surface and said surface part are pressed together by axially directed forces.

The present invention eliminates the abovementioned risk of inadvertent release of the tool shaft from the tool holder because axial forces tending to separate the tool shaft from the tool holder are at least partly converted into a torque tending to drive the tool shaft in its normal rotational direction so that release of the tool shaft implying rotation of the shaft in the opposite direction becomes unlikely or even impossible.

The abutment surface of the tool shaft and the cooperating surface part of the driving element may by any suitable type of cooperating cam surfaces. As an example, the abutment surface as well as the said surface part of the driving element may be substantially flat surface parts extending in the same direction and obliquely in relation to the longitudinal axis of the tool shaft. Alternatively, the abutment surface as well as the surface part of the driving element may be curved, or one of the cooperating surface parts may be convexly curved and the other flat.

The invention also relates to a tool holder for use in the above combination and comprising a socket member defining a substantially cylindrical bore, and a driving element mounted in said socket member so as to be displaceable transversely to the longitudinal axis of said bore between an extended position in which part of said driving element extends into said bore, and a retracted position in which said element is retracted from said bore, said part of the driving element being extendable into said cylindrical bore comprising a cam surface shaped so as to tend to rotate a tool shaft inserted in said bore in the normal rotational direction of an associated tool when said abutment surface of said tool shaft recess is pressed against said cam surface by axially directed forces.

Furthermore, the present invention relates to a tool shaft for use in the above combination and having a free end, at least one recess being defined spaced from said free end and forming adjacent to said free end an abutment surface extending transversely to the longitudinal axis of the tool shaft, said abutment surface comprising a cam surface being shaped so as to tend to rotate the tool shaft in the normal rotational direction of an associated tool when said cam surface is pressed against said driving element of the tool holder by axially directed forces.

The said cam surface may for example be a convexly curved surface part or a screw-shaped surface part. However, according to the invention the said cam surface is preferably a substantially flat surface part extending obliquely in relation to the longitudinal axis of the tool shaft. The recess may then be formed in the tool shaft by a simple cutting operation by using a rotating or reciprocating cutting tool. The said flat cam surface may define an angle exceeding 15° in relation to the plane normal to the longitudinal axis of said cylindrical bore, and the said angle is preferably approximately 20°.

The risk of inadvertent release of the tool shaft from the tool holder may be further decreased by forming the bottom surface part of the recess so as to comprise a slightly curved helical or screw-shaped surface which may cooperate with the driving element of the tool holder so as to restrain axial movement of the tool shaft and so as to partly convert such axial movement into a torque tending to rotate the tool shaft in the normal rotational direction of the associated tool. The pitch of the helical or screw-shaped surface is preferably rather large, for example 20–40 cm per turn.

The tool shaft according to the invention is especially intended for use in connection with tools of the type which is only rotated in one and the same direction during use. Examples of such tools are drills, screw drivers, grinding wheels, milling tools, etc., whether such tools are adapted for use in connection with machine tools, motor driven hand tools, such as portable electrical drilling machines, or manually operated tools.

BRIEF DESCRIPTION OF THE DRAWINGS

The invention will now be further explained with reference to the drawings, wherein FIG. 1 is a side view and partially sectional view of an embodiment of the tool holder according to the invention with a tool shaft according to the invention mounted therein, FIGS. 2, 3, and 4 are sectional views along the line A — A in FIG. 1 showing the tool shaft in three different angular positions in relation to the tool holder, FIGS. 5a and 5b are side views in different directions at right angles of an embodiment of the tool shaft according to the invention shown in a smaller scale, FIG. 6 is a side view and partially sectional view of a second embodiment of the tool holder, FIGS. 7 and 8 are views corresponding to that of FIG. 1, but showing modifications of the driving element of the tool holder and the recess of the tool shaft, and FIG. 9 is a side view and partially sectional view of a further embodiment of the tool holder in which a tool shaft supporting a milling tool is mounted.

DESCRIPTION OF PREFERRED EMBODIMENTS

FIGS. 1-5 of the drawings show a tool holder or a drill holder generally designated by 10 and adapted to receive a shaft 12 of a tool or drill 11. The bore holder comprises a socket 13 defining a cylindrical bore in which the drill shaft 12 may be received. The socket 13 is surrounded by a resilient ring 14 arranged in an exterior annular recess defined in the socket (FIG. 1) and which may, for example, be made from rubber or a suitably resilient plastic material. A driving element 15 is arranged in a throughgoing transverse passage in the socket 13 so that it is displaceable in a plane spaced from and parallel to a plane 16 containing the axis of the tool holder. The resilient ring 14 engaging the outer end of the driving element 15 exerts an elastic inward pressure on the driving element whereby it is pushed towards its inner position (FIG. 2) in which the inner end surface of the driving element 15 abuts a radially extending stop surface 17 formed in the socket 13. At its upper end the tool holder shown in FIG. 1 is provided with a threaded bore 18 by means of which the tool holder may be screwed on a motor-driven part 19 which may for example form part of a machine tool or a portable electrical drilling machine.

The tool shaft or drill shaft 12 may be provided with a recess 20, and in the embodiments shown on the drawings this recess has the form of a substantially plane milling off at one side of the tool shaft. However, as explained above the bottom surface of the recess preferably forms part of a helical or screw-shaped surface having a large pitch as indicated in FIG. 5b. The recess 20 is defined by upper and lower obliquely extending surfaces 21 and 22, respectively, of which the upper surface 21 is of special importance. The angle defined between this upper surface 21 and a plane normal to the longitudinal axis of the tool shaft advantageously exceeds 15° and is preferably approximately 20°, and as indicated in FIG. 1 the upper edge surface 23 of the driving element 15 may have a corresponding inclination.

The substantially plane bottom surface of the recess 20 may be considered divided into a torque transmitting surface part or driving surface part 24 and a cam surface part 25, vide FIG. 1. When the shaft 12 of the drill 11 is mounted in the tool holder 10 and the driving element 15 is in its inner end position as shown in FIG. 2 rotation of the tool holder in the direction indicated by an arrow in FIG. 2 causes the driving element 15 to engage with the torque transmitting surface part or driving surface part 24, whereby the rotational movement of the tool holder 10 is transmitted to the drill 11.

When the tool or drill 11 is to be removed from the holder 10 the socket 13 may be kept stationary while the drill shaft 12 is manually rotated in the direction indicated by an arrow in FIG. 3. The cam surface part 25 of the recess 20 then comes into engagement with the end surface of the driving element 15 as shown in FIG. 3 and the driving element will be moved outwardly against the bias exerted by the elastic ring 14. When the shaft 12 has been rotated to such an angular position that the driving element 15 is no longer engaging the recess 20 (FIG. 4), the drill shaft may right away be pulled axially out from the socket 13.

In cases where a rotational as well as a percussive movement are imparted to the tool 11 during use, these percussive movements may tend to expel the tool shaft 12 from the socket 13. However, thereby the obliquely extending surface 21 of the recess 20 is brought into engagement with the upper, obliquely extending edge surface 23 of the driving element, and these oblique surfaces will cooperate so as to convert the axial movement of the drill shaft in relation to the socket into a relative rotational movement tending to bring the driving element 15 into engagement with the torque transmitting surface part 24, whereby inadvertent release of the drill shaft 12 is counteracted.

FIG. 6 shows a modified embodiment of the tool holder according to the invention corresponding substantially to that shown in FIGS. 1-4 with the exception that a conical skirt or shield 26 is formed at the upper edge of the ring 14 and integrally therewith. This skirt may for example serve to prevent borings or bore meal from penetrating into the bearings of the drilling machine in connection with which the tool holder is used. Alternatively, the resilient ring 14 may be provided with any other type and shape of shield which is preferably formed integrally with the ring. As an example, such shields may be adapted to prevent that a flow of cooling air from the driving motor whirls up the bore meal in a disadvantageous manner.

FIG. 7 shows an embodiment similar to that shown in FIGS. 1-6 with the exception that the upper cam surface or edge surface 21 in the recess 20 of the drilling shaft 12 has a convexly curved shape while the lower edge surface 22 of the recess has a corresponding concavely curved shape. If the drill 11 is displaced axially outwardly in relation to the socket 13 the upper edge surface 23 of the driving element 15 will cooperate with the convex edge surface 21 in such a manner that the drill 11 is actuated for rotation in its normal rotational direction.

In the embodiments shown in FIGS. 1-7 the driving element 15 is displaceable in an outwardly and upwardly inclining direction. This inclined direction of displacement facilitates insertion of the drill shaft 12 into the socket 13 because the drill shaft may push the driving element out from the axial bore of the socket 13 against the bias of the elastic ring 14 when the free end of the shaft abuts the driving element 15. When the drill shaft 12 has been pushed so far into the socket 13 that the recess 20 registers with the driving element 15 this element is automatically moved back to its inner position and into engagement with the recess 20.

In the embodiment shown in FIG. 8 the driving element 15 is mounted so as to be displaceable in a purely radial direction, and the upper edge surface 23 of the driving element has a convexly curved shape for cooperating with the upper edge surface 21 of the recess 20. In the embodiment shown in FIG. 8 the driving element 15 is provided with a lower inclined edge surface 27 in order to facilitate insertion of the drill shaft 12 into the socket 13. When the drill shaft 12 is pushed into the socket the free end of the drill shaft cooperates with the inclined edge surface 27 so as to displace the driving element 15 radially outwardly against the bias of the ring 14.

In the embodiment shown in FIG. 9 a milling tool 28 is mounted on the tool shaft 12. In the embodiments described above the axial extension of the driving element 15 is smaller than the axial extension of the recess 20 so that the tool 11 may perform a limited axial movement in relation to the tool holder 10. In the embodiment shown in FIG. 9, however, the axial extension of the driving element 15 is substantially the same as that of the recess 20. In this case the axially inner end of the driving element 15 may advantageously be provided with a layer of elastic or resilient material 29 such as rubber or plastic, defining the oblique edge surface 23. The resiliency of the layer 29 permits use of less tight tolerances in the manufacture of the driving element 15 and the recess 20.

While the invention has mainly been described only in connection with a holder for a drill and a milling tool it should be understood that the invention also comprises other types of tool holders and tool shafts as mentioned above. It should also be noted that the tool holder may be provided with two or more driving elements, if desired, and the corresponding tool shaft should then be provided with a corresponding number of recesses. In the embodiments shown on the drawings, the tool shaft is formed integrally with the associated tool. However, the tool shaft may alternatively have the form of a separate part, a connecting part or an adaptor which may be connected to the tool in any suitable manner, for example by means of cooperating conical surfaces which permits use of different tools in connection with one and the same tool shaft.

I claim:

1. A combination of a rotary tool holder having a substantially cylindrical bore and being adapted for rotation in at least one direction, and a tool shaft releasably received in said bore and having a recess therein, said tool holder comprising at least one driving element transversely and slidably mounted in said tool holder, said driving element being movable into and out of driving engagement with said recess, said recess having first cam surface means and said driving element having second cam surface means, said first and second means cooperating so as to move said driving element out of engagement with said recess when the tool shaft is rotated relative to the tool holder in a first direction, and said recess having third cam surface means and said driving element having fourth cam surface means, said third and fourth means extending transversely to the axis of the tool shaft for actuating said tool shaft for rotation relative to said holder in a second direction opposite to said first direction when said third and fourth means are pressed together by axially directed forces.

2. For use with a tool shaft having a free end portion and a recess spaced from the free end, said recess having second cam surface means extending transversely to the axis of said tool shaft, said second cam surface means being at the end of the recess adjacent to the free end of said shaft, and said recess defining first cam surface means, a rotary tool holder comprising a socket member being adapted for rotation in at least one direction and having a substantially cylindrical bore, and a driving element mounted in said socket member so as to be displaceable transversely to the longitudinal axis of said bore between an extended position in which part of said driving element extends into said bore, and a retracted position in which said element is retracted from said bore, said part of the driving element being extendable into said cylindrical bore defining third cam surface means and fourth cam surface means, said first cam surface means and said third cam surface means cooperating for actuating said tool shaft for rotation relative to said holder in a second direction opposite to said first direction when said second cam surface means of said tool shaft recess is pressed against said fourth cam surface means of said driving element by axially directed forces.

3. A tool holder according to claim 2, wherein said fourth cam surface means of said driving element comprises a substantially flat surface part extending obliquely to the longitudinal axis of said cylindrical bore.

4. A tool holder according to claim 3, wherein that said substantially flat surface part defines an angle exceeding 15° in relation to a plane normal to the longitudinal axis of said cylindrical bore.

5. A tool holder according to claim 4, wherein said angle is approximately 20°.

6. A tool holder according to claim 3, wherein said driving element is mounted so as to be displaceable in the oblique direction defined by said substantially flat surface part.

7. A tool holder according to claim 2, wherein said fourth cam surface means of the driving element is defined by the outer surface of a layer of a resilient material.

8. A tool holder according to claim 2, wherein said driving element extends through the wall of said socket member, and a resilient ring surrounds said socket member and engages the adjacent outer end of said driving element.

9. A tool holder according to claim 8, wherein said resilient ring has a radially outwardly extending flange or skirt formed integrally therewith.

10. A combination of a rotary tool holder having a substantially cylindrical bore and being adapted for rotation in at least one direction, and a tool shaft having a free end portion releasably received in said bore, said tool shaft defining therein at least one recess spaced from the free end of the shaft and being formed with an abutment means extending transversely to the axis of said tool shaft, said abutment means being at the end of the recess adjacent to the free end of the shaft, said recess defining first driving surface means and first cam surface means, said tool holder comprising at least one driving element mounted in said tool holder so as to be displaceable transversely to the longitudinal axis of said bore between an extended position in which part of said driving element extends into said bore, and a retracted position in which said element is retracted from said bore, said drive element defining upper edge surface means, second driving surface means and second cam surface means, both of said cam surface means, both of said cam surface means cooperating so as to move said driving element out of engagement with said recess when the tool shaft is rotated relative to the tool holder in a first direction, and said upper edge surface means and said abutment surface means cooperating to bring both of said driving surface means into engagement to actuate said tool shaft for rotation relative to said holder in a second direction opposite to said first direction when said abutment surface means and said upper edge surface means are pressed together by axially directed forces.

11. For use with a tool shaft having a free end portion, and a recess spaced from the free end, said recess having abutment surface means extending transversely to the axis of said tool shaft, said abutment surface means being at the end of the recess adjacent to the free end of said shaft, and said recess defining first driving surface means and first cam surface means, a rotary tool holder comprising a socket member being adapted for rotation in at least one direction and having a substantially cylindrical bore, and a driving element mounted in said socket member so as to be displacable transversely to the longitudinal axis of said bore between an extend position in which part of said driving element extends into said bore, and a retracted position in which said element is retracted from said bore, said driving element being movable into and out of driving engagement with said recess when said tool shaft is inserted into said bore, said driving element defining upper edge surface means, second driving surface means and second cam surface means, both of said cam surface means cooperating so as to move said driving element out of engagement with said recess when said tool shaft is rotated relative to said socket member in a first direction, and said upper edge surface means and said abutment surface means cooperating to bring both of said driving surface means into engagement to actuate said tool shaft for rotation relative to said socket member in a second direction opposite to said first direction when said abutment surface means and said upper edge surface means are pressed together by axially directed forces.

* * * * *